May 12, 1936. P. CLANCY Re. 19,960

CORRECTIVE BRASSIÈRE.

Original Filed March 18, 1933 2 Sheets-Sheet 1

INVENTOR.
PATRICIA CLANCY
BY
ATTORNEY

May 12, 1936. P. CLANCY Re. 19,960
CORRECTIVE BRASSIÈRE
Original Filed March 18, 1933 2 Sheets-Sheet 2
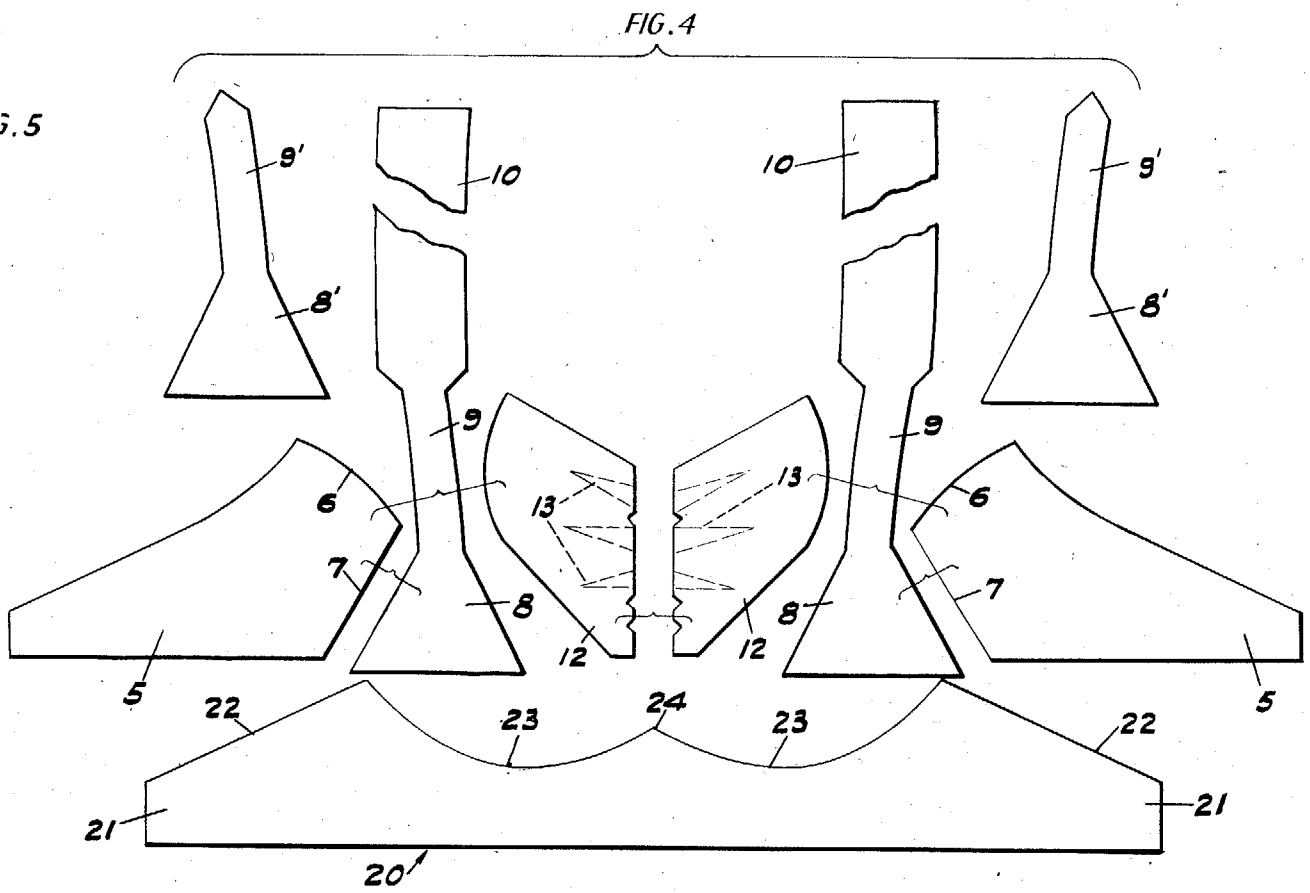
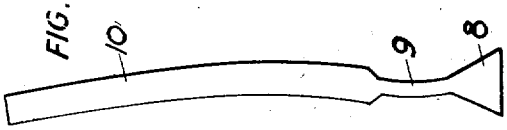
INVENTOR.
PATRICIA CLANCY
BY
ATTORNEY Reissued May 12, 1936

Re. 19,960

UNITED STATES PATENT OFFICE 19,960

CORRECTIVE BRASSIÈRE

Patricia Clancy, San Diego, Calif.

Original No. 1,937,008, dated November 28, 1933, Serial No. 661,546, March 18, 1933. Application for reissue October 23, 1934, Serial No. 749,647

5 Claims. (Cl. 2—42)

This invention relates to garments of the brassière type and particularly to a brassière garment having for one of its principal objects the provision of improved means for correctively rejuvenating, invigorating and restoring in a superior manner the broken down tissues of a woman's bust, whereby drooping breasts are caused to resume a more upright position, hence contributing to a woman's figure, comfort and health.

It is an object of the invention to provide an improved combination of parts for a garment of this kind which may be united to each other in such a manner that the garment as a whole will be comfortable, durable and will dependably maintain itself in the proper wearing position.

A particular object of the invention is to provide a superior reinforced forwardly expanded portion of the garment which will fit over each breast in a more perfect manner and which may be depended upon to hold up and slightly compress the breast in the manner which is most conducive to health and to improvement of the figure.

Still another object of the invention is to provide means to support the brassière from the shoulders of the wearer in a more dependable, comfortable and hygienic manner, and in such a manner that it may be held up at higher levels as the process of rejuvenation proceeds.

Other objects, advantages and features of the invention may hereinafter appear.

Referring to the accompanying drawings which illustrate what is at present deemed to be a preferred embodiment of the invention, Fig. 1 is a front elevation of the complete article, except that a portion of one of the shoulder straps and back straps is broken away.

Fig. 4 is a plan view of the assembly of fabric blanks of which the article is composed, these blanks being shown juxtaposed to each other in such a manner as to indicate the proper manner of assembling them. Parts of the longest blanks are broken away to contract the view.

Fig. 5 is a plan view, on a reduced scale, completely showing one of the companion blanks which are broken away in Fig. 4. These pieces are related to an important feature of the invention.

Figure 2:
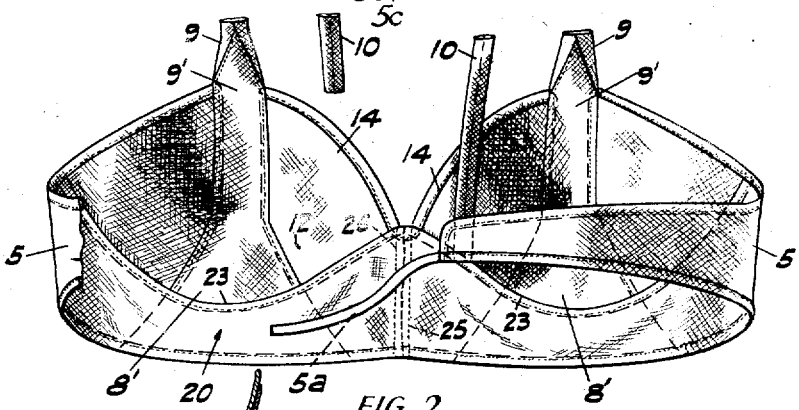
Fig. 2 is a back view of the article, certain terminal portions being broken away to contract the view.

Referring in detail to the drawings, a description will be given of the right hand half of the article, it being understood that the two halves thereof are duplicates. The outer side sections 5 are of a somewhat wedge-shaped character. Their tapered ends are directed rearwardly and have the tie strips 5a secured to them. Each of these side sections is provided at its wide end with an upper edge 6 which is slightly curved in an outward manner, and with a lower edge 7 which joins said edge 6 in such a manner as to form an outwardly directed angle or convex edge adapted to traverse the breast from a point above the nipple to a point below the breast to permit the section 5 to cover the outer side of the breast when applied thereto. To the front end of each member 5 is stitched the double breast member 8, 8', shown in section in Fig. 3. Said breast member may consist of two superposed members having triangular base portions, the apex of their triangles being continued upwardly into extensions 9, 9'. The innermost of these superposed members has a relatively short extension 9' as seen in Fig. 2, but the outer breast member has its extension 9 continued upwardly, backwardly and downwardly to form the shoulder strip 10. The back end of this shoulder strip is stitched to the rear portion of the side piece 5. The fabric piece for each shoulder strip is considerably wider than the completed strip, and the side portions thereof are folded downwardly to meet at the mid-width of the strip, where they are stitched thereto.

Figure 1:
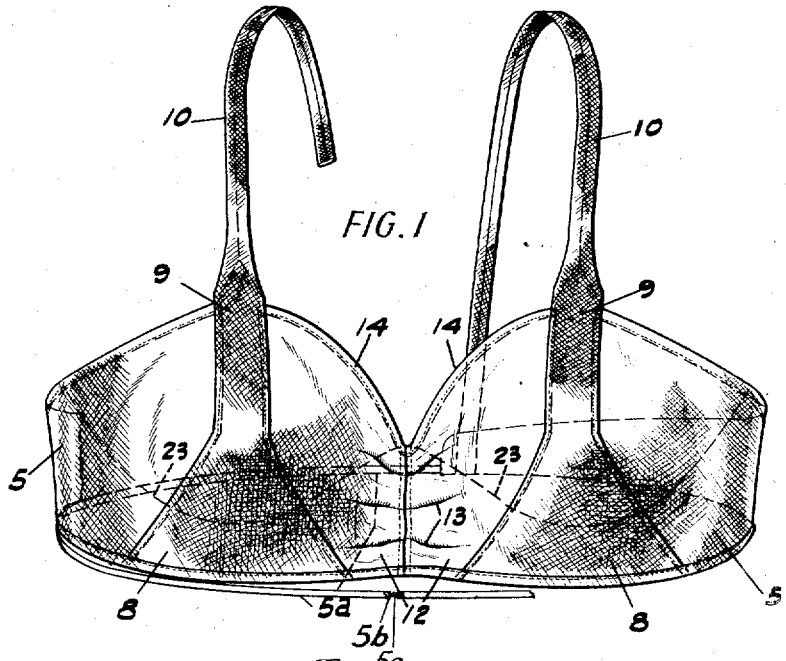

The members 5a are of such elasticity or stretchability that they may be elongated or stretched several times their normal length so as to oppositely semi-encircle the body and be fastened together directly in front of the body subjacent the mid-center of the device as indicated in the lower portion of Fig. 1.

The ends of the strip 5a are fastened together in front in any suitable manner as by the terminal catch elements 5b and 5c.

The front portion of the article is completed by the two companion sternum pieces 12 which are each shaped as a semi-heart shaped body, as seen in Fig. 4, provided with a convex edge. In stitching these members together along a vertical median line, their meeting edge portions are each provided with a series of transverse tucks 13. Hence when the stitching is completed the meeting edges of these pieces are shortened, thereby forming an upwardly and laterally extending wing 14 at each side of the median line. These sternum pieces are thereby capable of covering the opposing, inner sides of the breasts, the tucks permitting each sternum piece to assume a spherical curved form while maintaining the portion adjacent their jointure in close proximity to the body. The superposed extensions 9, 9', as viewed from the front are each slightly curved with the convex side directed toward the center. This construction forms a more natural support for each breast and also causes the strain upon the shoulder strip to be directed inwardly as well as downwardly overcoming the tendency of the strap to slip off from the shoulder.

The members 10 are slightly curved and are inclined outwardly toward the shoulders at both the front and the rear of the garment. Each of the straps 10 is fashioned so as to lay upon the shoulders in a flat manner, thereby preventing the straps from cutting into the shoulders or from slipping off when in use. This is accomplished by forming the shoulder straps 10 as shown in Fig. 5, which illustrates a strap for use on the left shoulder of the wearer. The strap 10, instead of being composed of a straight ribbon with straight sides, is preferably cut from suitable material along a gentle curve so that, when applied to the body, it will curve outwardly from a point at the upper edge of the brassière proper toward the lower portion of the shoulder and then curve downwardly and toward the lower spine. In this manner, the strap follows the contour of the body and no unequal stresses are set up in edge portions of the strap, preventing chafing or slipping. The rear ends of the straps 10 may be attached to terminal portions of members 5.

By reason of the curved form of straps 10, it will be found that when the finished garment is upon the body the straps 10 are slightly closer together at the upper edge of the brassière than at the shoulders. The median points of the breast-traversing members 9 (at the lower edge of the brassière) are also closer together (separated a shorter distance) than the distance separating the straps 10 at the upper edge of the brassière. The members 5 and 12 cooperate to form a somewhat conical breast-receiving pocket traversed by the member 9 and the apexes of such pockets (when the garment is worn) should be spaced a suitable distance (differing with the size of the bust) but preferably slightly longer than the distance separating the straps 10 at the upper edge of the brassière, so as to tend to draw the breasts together.

Figure 3:
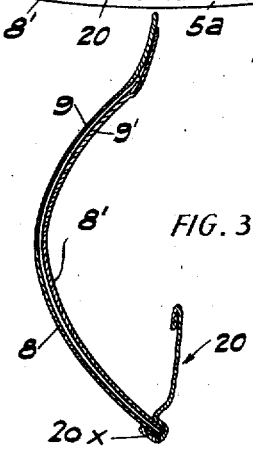
Fig. 3 is a vertical section taken through the mid-width of the left hand shoulder strap of Fig. 1.

Both the side edge portions of the superposed breast pieces 8 are lapped over and are stitched to the adjoining edge portions of the fabric. The sectional view (Fig. 3) illustrates this feature. Also the base edges of the superposed triangular portion 8, 8' are included within an edge fold 20*x* with which the part 20 is provided as shown in Fig. 3.

Along the inner side of the lower portion of the article a combined reinforcing member and breast pocket member 20 is provided, said member consisting of an elongated strip having a straight lower edge and tapered end portions 21. The upper edge 22 of each end portion 21 is straight and downwardly inclined as best shown in Fig. 4. Said end edges 22 are connected by two concave edges 23 which meet at an upwardly directed angle 24 at the center of the piece. Opposite said angle 24, vertical stitching 25 secures the piece 20 to the front portion of the article, the pieces 12 meeting at this point and having their contiguous edges stitched down as well shown in Fig. 2.

Attention is called to the fact that the member 20 is attached to the brassière at the outer termini of the concave edges 23 and substantially at the level of the nipples, thereby providing a support for the breast at a zone where sagging normally starts.

This construction enables a saggy breast to be raised or cultivated back to its normal position by various or continuous elevating stages, that is to say, the waist band of the brassière is elevated from one level to another as the broken down tissues are restored or are being built up. The brassière proper may be elevated to maintain the broken down tissues in their built up condition and thus permit the building up of additional tissues to maintain the bust in a more elevated position until at last the bust is completely built up to its original position.

A heavy bust will require greater stress being placed in the elastic to maintain its fixed position than a light one and the adjustment from one point of elevation of the bust to another is varied slightly to conform to the comfort and wishes of the wearer.

The operation whereby this adjustment is regulatable consists in grasping the brassière at a point 9 by right hand on the left side and raising that point of the brassière together with the breast to a position it is desired to elevate the bust and then grasping the elastic strip 5*a* that continues from the right side by the left hand, pulling on said elastic until the desired comfortable or building up position is obtained. The elastic tie strips 5*a* are then secured together around the body in a crosswise fashion to keep the brassière in the adjusted position. The looseness of the elastic is thereby converted from the rear to the front of the body.

No generic claim is made to the breast or back pocket feature per se, but one of the novel features of the invention pertains to the breast strip 8 which is located at the mid-width of each breast pocket, and which is suited not only to conform to the natural shape of the breast but also in combination with the shoulder strip, to sustain the breast-supporting part in a more dependable manner.

The various edge portions of the article are provided with suitable bindings, as shown.

I claim:

1. In a brassière, a structure consisting of two complementary halves each of which has a breast pocket construction which includes a front side breast member, the latter consisting of two superposed similar fabric pieces having downwardly diverging side edges; a sternum piece stitched to the inner side edges of said breast member; an outer side piece stitched to its outer side; and means to complete the entire structure, said means including shoulder strips continuous with the upper portions of said superposed pieces.

2. In a brassière, a body-encircling structure which is made up in part of a breast member having downwardly diverging side edges, said breast member being a sheet of fabric a portion of which is narrowed and extended upwardly to perform the function of a shoulder strap, said upwardly extended portion being curved laterally away from the median line in order to cause the shoulder strap portion thereof to engage the shoulder in a flat-wise manner.

3. In a brassière, a heart-shaped sternum piece consisting of two complementary halves which are stitched together at the median line, transversely extending tucks being provided in each half of said sternum piece, said tucks extending outwardly from the median line, a breast piece consisting of a piece of fabric stitched to each of the outer edges of said sternum piece, the lower part of said breast piece having downwardly diverging side edges and the upper part of said breast piece being continued upwardly to perform the function of a shoulder strap, and means secured to the outer edges of said breast pieces to extend the article around the body of the wearer.

4. A brassière structure including a central portion comprising a pair of wing-shaped sternum members connected together along a vertical median, tucks in said members extending from said median whereby said sternum members are adapted to cover opposing inner sides of the breasts; side members approximately triangular in shape adapted to cover the outer sides of the breasts and connected with said sternum members to form breast-receiving pockets; and strip members traversing said breast-receiving pockets from the bottom thereof to the top thereof substantially in alignment with shoulder straps.

5. A brassière structure including a central portion comprising a pair of wing-shaped sternum members connected together along a vertical median, tucks in said members extending from said median whereby said sternum members are adapted to cover opposing inner sides of the breasts; side members approximately triangular in shape adapted to cover the outer sides of the breasts and connected with said sternum members to form breast-receiving pockets; and strip members traversing said breast-receiving pockets from the bottom thereof to the top thereof substantially in alignment with shoulder straps, the ends of the strip members at the upper edge of the brassière being spaced a greater distance than at the bottom of the breast-receiving pockets.

PATRICIA CLANCY.